Nov. 11, 1969  J. T. PODIAK  3,477,737

SELECTIVELY MOBILE APPARATUS

Filed Dec. 2, 1968

INVENTOR.
JOSEPH T. PODIAK
BY
Myron E. Click
ATTORNEY

United States Patent Office 3,477,737
Patented Nov. 11, 1969

3,477,737
SELECTIVELY MOBILE APPARATUS
Joseph T. Podiak, 312 Indiana Ave.,
Maumee, Ohio 43537
Filed Dec. 2, 1968, Ser. No. 780,317
Int. Cl. B62b 1/00; A47b 31/00
U.S. Cl. 280—43        12 Claims

ABSTRACT OF THE DISCLOSURE

An apparatus for making furniture or other cumbersome devices, having at least two spaced legs, selectively mobile which includes one or more wheels, an axle of deformable spring material to carry the wheels and mounted between the legs to position the wheels in a nonsupporting position for the device, and detent means mountable upon the device to receive and retain the axle when the axle is deformed downwardly to place the wheels in a device-supporting position.

---

This invention relates to roller attachments for any piece of apparatus, particularly those that are cumbersome, heavy or otherwise difficult to move, selectively mobile by engaging wheels or rollers with the ground or floor so that the apparatus may be moved by a single individual. The invention may also be utilized with apparatus which is capable of being picked up by one or more persons by lifting the apparatus bodily from the ground or floor and carrying it to a new position, but which may be more readily handled by the use of the invention disclosed and described herein.

Although not exclusively applicable to, the invention is particularly suited for use with heavy pieces of lawn furniture which derive their weight from the fact that quality pieces of lawn furniture are normally made from the heavier woods in order to improve their stability and life expectance. There are frequent occasions when it is desirable to move such lawn furniture when two adults are not present to lift the furniture free from the ground or floor on which it is resting and move the pieces to a new position.

Several attempts to solve this problem have been made in the past which include the provision of permanent wheels. Those of wooden construction may easily split or be otherwise damaged and does not appreciably reduce the friction involved when the wooden wheel is combined with a wooden axle. Further, in a permanent fixture in which the wheels are in constant contact with the ground the stability of the furniture is reduced to some extent since the wheels may permit movement when movement is not desired. Other attempts have been made with lawn furniture or other heavy and cumbersome devices such as desks, shipping containers or the like to provide wheels which may be placed in a device-supporting relationship with respect to the ground through a complicated and relatively expensive mechanism which moves a rigid axle and wheels with respect to the device which it supports.

While the above attempts to solve the problems hereinbefore stated have contributed to the advance of the art, the devices still have the disadvantages listed and it is accordingly an object of this invention to provide an improved apparatus for making furniture or other cumbersome devices selectively mobile.

It is a further object of this invention to provide selectively mobile apparatus, the mobile mechanism of which may be inexpensively produced and easily operated.

It is a still further object of this invention to provide improved selectively mobile lawn furniture having at least two wooden legs and in which means are provided to protect the wooden legs from the chipping and breaking normally associated with mobile lawn furniture and against the discoloration of the finish on the wooden legs which results from ground contact, and to further protect the wooden legs from deterioration.

In accordance with the above objects the invention features selectively mobile lawn furniture having at least two wooden legs, since additional support is sometimes provided by a pedestal type member spaced from the two wooden legs. Wheel means of the disc type, roller type or other mobility providing equivalence are shown along with an axle mounted between the wooden legs. The axle carries the wheel means in a non-supporting position for the furniture. The axle is sufficiently flexible to permit deformation downwardly. The axle also has sufficient resistance to deformation to hold the wheel means below the wooden legs and lift the legs from ground contact when the axle is deformed downwardly to a predetermined point. Detent means are provided for receiving and retaining the axle at a predetermined point of deformation so that the mobility of the lawn furniture may be maintained until it is desired to remove the axle from the deformed position. The furniture discussed above further includes protective caps for the undersurface for each of the wooden legs constructed of chip and moisture resistant materials to protect the finish on the wooden legs from discoloration, prevent chipping or splitting of the wooden legs, and prevent rot or other deterioration of the wooden legs when in contact with the ground or other moist surface.

While the invention has been described above as being applicable to wooden lawn furniture it is obvious that the invention can be more widelly applied to provide selectively mobile apparatus comprising a device having two spaced axle retaining elements, wheel means, an axle of deformable spring material mounted between the axle retaining elements and carrying the wheel means in a non-supporting position for the device, and detent means for receiving the axle when the axle is deformed downwardly to place the wheel means in a device-supporting position. The detent means in its simplest construction may comprise a bracket or brace member extending downwardly between the axle retaining elements and having a groove formed in the undersurface thereof to receive the axle.

The wheel means may comprise at least one, and in the preferred embodiment two, disc-type wheels journally mounted on the axle. In an alternative embodiment the wheel means may comprise roller means connected to the axle through swivel means to permit the roller means to track in any direction in which the apparatus is being pushed or pulled.

The axle may be constructed from spring steel or any other suitable spring-type metal. The axle is preferably constructed from flexible plastic. The plastic is advantageously reinforced by glass fibers oriented along the length of the axle to receive the tensile stress placed on the axle when the axle is deformed to place the wheel means in a device-supporting position.

In a first embodiment illustrated herein the wheel means comprises two wheels journally supported in a spaced relationship on the axle while the detent means comprises a brace member extending downwardly between the wheels to receive and retain the axle when deformed. Whether one or more wheels are provided on the axle or supported by the axle, there is also illustrated an alternative embodiment in which the detent means comprises two separate brace members extending downwardly on the outside of the wheel means to receive the deformed axle between the wheel means and the axle detaining elements.

Other objects, advantages and features will become apparent when the following description is taken in conjunction with the accompanying drawing, in which.

Figure 1:
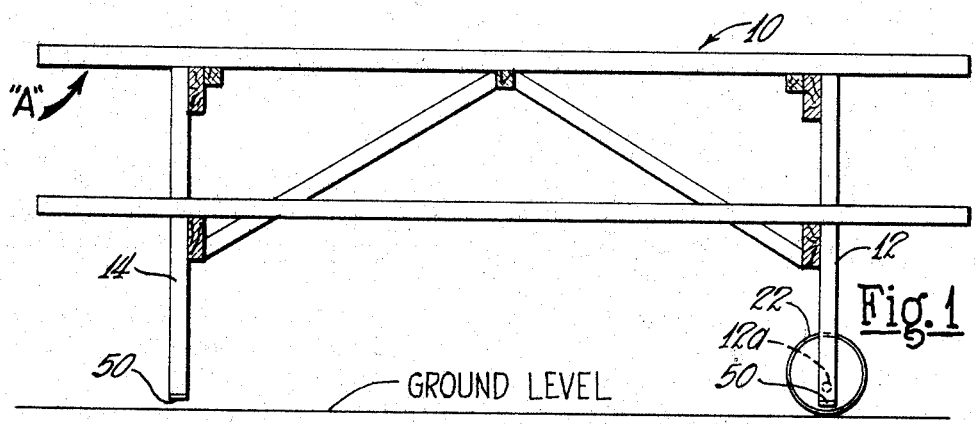
FIGURE 1 is a side elevational view of lawn furniture embodying the teachings of this invention.
Figure 2:
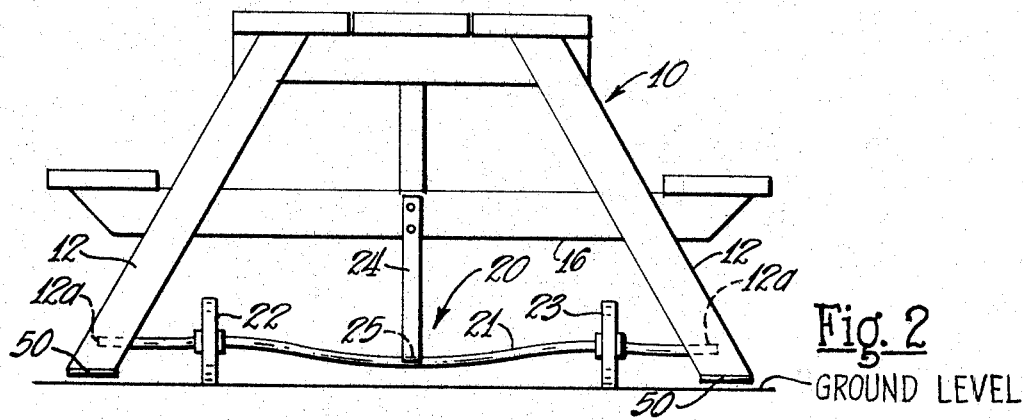
FIGURE 2 is an end elevational view of the apparatus of FIGURE 1 showing the selectively mobile apparatus in an engaged position.
Figure 3:
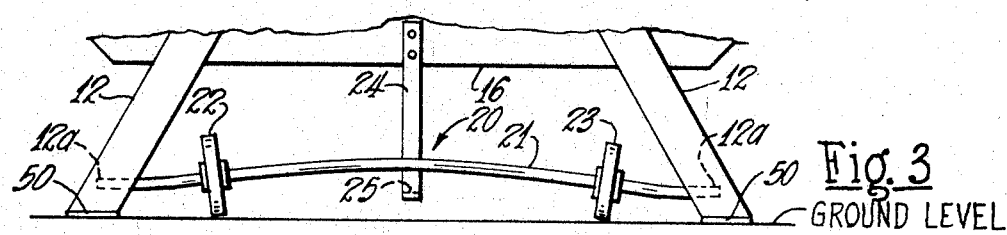
FIGURE 3 is a partial end view of the apparatus illustrated in FIGURES 1 and 2 showing the selectively mobile portion in a disengaged position.

Referring to FIGURES 1, 2 and 3, there is illustrated a first embodiment of the teachings of this invention in connection with a piece of lawn furniture generally indicated at 10 which is shown in the form of a picnic table. Quality picnic tables are made from heavier wood sections which are bolted, glued or otherwise suitably secured together to form the desired configuration. Use of heavier lumber results in a quality, longer lasting piece of furniture. However, the resulting furniture is heavier and very difficult for an individual to move. This invention then is related to such devices and apparatus for making the devices selectively mobile.

The table generally indicated at 10 includes in this instance spaced legs 12, at the right side in FIGURE 1 and one or more legs 14 at the left side of FIGURE 1. The invention is described with respect to a device or apparatus having two spaced legs, such as 12, 12, while the remaining support may be provided by two spaced legs 14, 14 or a pedestal at the opposite end, or a single leg at the opposite end since only three point support is required for some devices. Since some apparatus are supported by only two downwardly extending elements such as pedestals, the legs 12, 12 are generically described herein as spaced axle retaining elements.

The portion of the apparatus for making the table or other device selectively mobile is generally indicated at 20 and includes an axle 21 of spring-type material, wheel means such as the disc members 22, 23, and a detent brace member 24 having a groove 25 formed in the undersurface thereof to receive and retain the axle 21 in the deformed position.

As noted hereinbefore the axle 21 may be constructed from any suitable spring-type material which is sufficiently flexible to permit deformation downwardly but which also has sufficient resistance to deformation to hold the wheel means below the legs and lift the legs from ground contact when the axle is deformed downwardly to a determined point. Materials suitable for this include the spring steels and their other metallic counterparts. A flexible plastic is particularly advantageous and desirable for use herein since plastic is generally less expensive, does not corrode or discolor and, particularly when reinforced with glass fibers having extremely high tensile strengths, have a strength that will stand up under repeated use or abuse. In a preferred embodiment the glass fibers are oriented lengthwise of the axle so that the stress applied to the axle when it is deformed is translated to tensile stress and applied to the tremendously strong glass fibers. In the apparatus illustrated herein in FIGURES 1, 2 and 3, the ends of the axle 21 are received in bores 12a formed in the legs 12. The disc-type wheels 22, 23 are journally mounted on the axle in spaced relationship.

Referring to FIGURE 3 the non-supporting position of the wheels 22, 23 is illustrated in which the flexibility of the axle 21 permits deformation upwardly of the axle in response to the weight of the table so that table legs 12, 12 are in a firm and stable position on the ground. Plastic caps 50 are adhered or otherwise fastened to the bottom of legs 12 so that the chipping of wooden legs which occurs in the moving and recontact of the legs 12 with ground, cement or other hard surfaces may be avoided. The protective plastic or other caps 50 also prevent moisture from seeping up through the wooden legs 12 which discolors the finish on the legs 12 or causes the legs to rot or otherwise deteriorate.

Figure 4:
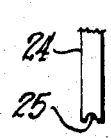
FIGURE 4 is a side elevational partial view of the detent brace utilized in the embodiments of this invention.

When it is desired to place the legs 12 in a wheel support position the user may place his foot upon the central portion of the axle 21 and force the axle 21 down along the brace or detent member 24 until it is below and registered with the groove 25 (best seen in FIGURE 4) formed in the undersurface of the detent member 24. The position thus attained is illustrated in FIGURE 2 and the table may be moved by a single individual applying force at the point A noted in FIGURE 1. Thus a heavy piece of lawn furniture may be easily moved by a single individual.

It is obvious that apparatus similar to that illustrated generally at 20 may also be utilized for the remaining legs 14, 14 to make the furniture even more mobile and require no lifting at all by the individual moving it. Thus, even children could move the apparatus.

Figure 5:
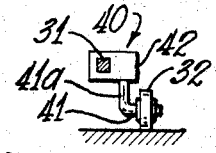
FIGURE 5 is a side elevational view of an alternate axle and wheel means construction suitable for use in this invention.

Referring to FIGURE 5 there is illustrated an alternative embodiment 31 of an axle to be mounted between spaced legs or other members. It is to be noted that the axle 31 is shown as square in cross section to point out that more than one configuration in the cross section of the axle is useful and permissible. In FIGURE 5 the non-circular configuration of the axle 31 has a purpose in that it is utilized to retain a swivel means 40 in a desired position. A roller means 32 which may be of the disc, ball or other type has an axle 41 which includes an upwardly extending portion 41a pivotally received by a journal or bearing means 42 of the swivel means 40. Thus the roller or wheel means 32 will pivot about the axis of the portion 41a to permit the wheel 32 to track in the direction that the table or other device is being pushed or pulled.

Figure 6:
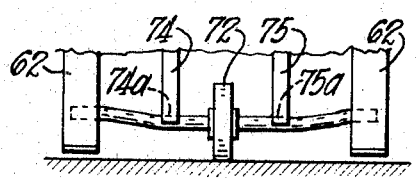
FIGURE 6 is a partial end elevational view of an alternate embodiment of the teachings of this invention.

Referring to FIGURE 6 there is illustrated an alternative embodiment of the teachings of this invention in which the use of a single wheel or roller 72 is illustrated. An axle 71 is mounted between leg members 62 and is shown in a downwardly deformed position in which the axle is received and retained in grooves 74a, 75a of detent or brace members 74, 75 to place the wheel or roller 72 in a supporting position for the legs 62. For some devices a single roller may be all that is required since, for example, by grasping the sides of the opposite end of the table 10 a wheel barrow effect is attained wherein only a single roller means is required to easily move the table to a new position.

It should also be noted that more than one wheel means may be provided between the detent members 74, 75 and that the choice of the number of wheel means and the positioning of the wheel means is determined by the particular application of the invention herein disclosed.

It should also be noted that the spring-type axle may be mounted straight across between the legs in a position where no upward deformation of the axle results when the legs are touching the ground. This would normally require more deformation in the downward direction when the wheels are placed in the leg-supporting position. Since the axle is flexible and permits upward deformation, the mounting as shown in FIGURE 3 is normally preferred to reduce the distance required when deforming the axle downwardly. The "straight-across" axle mounting may be advantageous for certain applications, however.

In summary, it should be noted that the invention also discloses a kit for making apparatus selectively mobile. The kit may include an axle of deformable spring-type material, wheel means adapted to be journally mounted, rotatably carried or otherwise supported by the axle, and detent means. The axle is adapted to be mounted on the apparatus with the wheel means carried thereby in non-supporting position for the apparatus. The detent means is adapted to be mounted on the apparatus to receive and hold the axle in a deformed position to place the wheel means in an apparatus-supporting position.

In conclusion it is apparent that, within the scope of the invention, modifications and different arrangements may be made other than those specifically herein disclosed and that there may be varying applications for the invention. Therefore the present disclosure is illustrative merely, the invention comprehending all variations of the disclosure where applicable.

I claim:

1. Selectively mobile apparatus comprising a device having two spaced axle retaining elements, wheel means, an axle of deformable spring material mounted between said axle retaining elements and carrying said wheel means in a non-supporting position for said device, and detent means for receiving said axle when the axle is deformed downwardly to place said wheel means in a device-supporting position.

2. Apparatus as defined in claim 1 in which said detent means comprises means extending downwardly between said axle retaining elements and having groove means formed in the undersurface thereof to receive said axle.

3. Apparatus as defined in claim 1 in which said wheel means comprises at least one wheel journally mounted on said axle.

4. Apparatus as defined in claim 1 in which said wheel means comprises roller means connected to said axle through swivel means to permit the roller means to track in any direction.

5. Apparatus as defined in claim 1 in which said axle is constructed from spring steel.

6. Apparatus as defined in claim 1 in which said axle is constructed from flexible plastic.

7. Apparatus as defined in claim 6 in which said plastic is reinforced by glass fibers oriented along the length of said axle to receive the tensile stress placed on said axle when the axle is deformed to place said wheel means in a device-supporting position.

8. Apparatus as defined in claim 1 in which said wheel means comprises two wheels journally supported in a spaced relationship on said axle, and said detent means comprises a member extending downwardly between said wheels.

9. Apparatus as defined in claim 1 in which said detent means comprises two separate members extending downwardly to receive said deformed axle between said wheel means and said axle retaining elements.

10. Apparatus for making furniture or other cumbersome devices, having at least two spaced leg means, selectively mobile comprising wheel means, an axle of deformable spring material to carry said wheel means and mountable between said leg means to position the wheel means in a non-supporting position for said device, and detent means mountable upon said device to receive and retain said axle when the axle is deformed to place the wheel means in device-supporting position.

11. Selectively mobile lawn furniture having at least two wooden legs comprising wheel means, axle means mounted between said wooden legs and carrying said wheel means in a non-supporting position for said furniture, said axle being sufficiently flexible to permit deformation downwardly, said axle also having sufficient resistance to deformation to hold said wheel means below said wooden legs and lift said legs from ground contact when the axle is deformed downwardly to a predetermined point, and means for receiving and retaining said axle at said predetermined point of deformation.

12. Furniture as defined in claim 11 which further includes protective caps for the undersurface of each of said wooden legs constructed of chip and moisture resistant material.

References Cited

UNITED STATES PATENTS 3,404,884  10/1968  Sorenson _____ 280—43

LEO FRIAGLIA, Primary Examiner

ROBERT R. SONG, Assistant Examiner